US006807469B2

(12) United States Patent
Funkhouser et al.

(10) Patent No.: US 6,807,469 B2
(45) Date of Patent: Oct. 19, 2004

(54) AUTO DIAGNOSTIC METHOD AND DEVICE

(75) Inventors: Travis Funkhouser, Carmel, IN (US); Jennifer Funkhouser, Carmel, IN (US); Kevin T. Combopiano, Indianapolis, IN (US); Michael Combopiano, Oakland, CA (US)

(73) Assignee: CarCheckup, LLC, Carmel, IN (US)

(*) Notice: Subject to any disclaimer, the term of this patent is extended or adjusted under 35 U.S.C. 154(b) by 0 days.

(21) Appl. No.: 10/172,349

(22) Filed: Jun. 14, 2002

(65) Prior Publication Data

US 2002/0193925 A1 Dec. 19, 2002

Related U.S. Application Data

(60) Provisional application No. 60/298,650, filed on Jun. 15, 2001.

(51) Int. Cl.[7] ............................ G06F 19/00; G06F 7/00

(52) U.S. Cl. ............................ 701/33; 701/29; 701/36; 340/438; 340/439

(58) Field of Search ......................... 701/29–30, 33–36, 701/65, 115; 340/438, 439, 500

(56) References Cited

U.S. PATENT DOCUMENTS

| | | | | |
|---|---|---|---|---|
| 5,499,182 A | | 3/1996 | Ousborne | 701/35 |
| 5,541,840 A | | 7/1996 | Gurne et al. | |
| 5,623,922 A | | 4/1997 | Smith | |
| 5,671,141 A | | 9/1997 | Smith et al. | 701/29 |
| 5,808,907 A | | 9/1998 | Shetty et al. | |
| 5,848,365 A | | 12/1998 | Coverdill | 701/35 |
| 6,052,631 A | | 4/2000 | Busch et al. | |
| 6,094,609 A | | 7/2000 | Arjomand | |
| 6,104,988 A | | 8/2000 | Klarer | |
| 6,169,943 B1 | * | 1/2001 | Simon et al. | 701/29 |
| 6,295,492 B1 | | 9/2001 | Lang et al. | |
| 6,314,422 B1 | | 11/2001 | Barker et al. | |
| 6,442,460 B1 | * | 8/2002 | Larson et al. | 701/33 |
| 2001/0033225 A1 | | 10/2001 | Razavi et al. | |
| 2002/0010541 A1 | | 1/2002 | Houston et al. | |
| 2002/0035421 A1 | | 3/2002 | Warkentin | |

FOREIGN PATENT DOCUMENTS

| | | |
|---|---|---|
| WO | WO 98/51991 | 11/1998 |
| WO | WO 99/23783 | 5/1999 |

* cited by examiner

*Primary Examiner*—Gertrude A. Jeanglaude
(74) *Attorney, Agent, or Firm*—E. Victor Indiano; Indiano, Vaughan, Roberts & Filomena, LLP

(57) ABSTRACT

According to the present invention, a vehicle monitoring and maintenance device capable of being connected to a diagnostic port of a vehicle is provided. The monitoring and maintenance device comprises a hand holdable, data acquisition and transfer device. The data acquisition and transfer device includes a first data link connectable to a diagnostic port of a vehicle for retrieving diagnostic data from the vehicle; and a second data link connectable to a global computer network communicable device. The data acquisition and transfer device also includes a processor and memory unit capable of retrieving unprocessed diagnostic data containing error codes from the vehicle via the first data link, storing unprocessed diagnostic data for a limited time, and transferring the unprocessed data to the global computer network communicable device, to the second data link. The hand holdable data acquisition and transfer device lacks sufficient data processing capability to fully process the unprocessed diagnostic data into human useable diagnostic information.

24 Claims, 4 Drawing Sheets

AUTO DIAGNOSTIC METHOD AND DEVICE

I. PRIORITY STATEMENT

This utility patent application claims priority to U.S. Provisional Patent Application, Serial No. 60/298,650, filed 15 Jun. 2001.

II. TECHNICAL FIELD OF THE INVENTION

The present invention relates to devices for diagnosing malfunctions in vehicles, and more particularly to a device and method for retrieving error codes from a vehicle data port, and for using the error codes so retrieved to diagnose the malfunction of the automobile.

III. BACKGROUND OF THE INVENTION

Vehicles, in particular, motorized vehicles such as automobiles and light duty trucks are complex machines with thousands of various parts that perform a vast array of operations that permit the vehicle to be operated by the user. As with any such complex machine, malfunctions occur in one or more parts of the vehicle from time to time.

Formerly, most vehicle malfunctions were relatively easy to diagnose and repair, especially on vehicles manufactured prior to 1970. Malfunctions on these older vehicles were typically easy to diagnose and repair because the vehicles were relatively simple, and their operating systems, such as engines and controls were primarily mechanical in nature, thus facilitating a relatively simple diagnosis of malfunctions when they occurred. However, such has not been the case for the last 30 years or so.

Since the early 1970s, vehicles have become substantially more complex, as a result of a variety of factors, including governmental regulations that mandated that vehicles pollute less, and consume fuel more efficiently. Additionally, the advent of consumer-available computerization, when coupled with consumer demand for convenience features such as electric windows, doors, door locks, and the like, have caused recently manufactured vehicles to become substantially more complex than their pre-1970s counterparts.

Most cars manufactured prior to 1970 could be serviced adequately, and have their problems diagnosed by consumers, or mechanics equipped with only rudimentary mechanical tools. However, the increasingly electronic-driven nature of new vehicles has made it difficult for consumers to either diagnose malfunctions in their vehicles or to repair them. Even professional mechanics must now rely on sophisticated electronic equipment to diagnose and repair vehicular malfunctions.

To better aid in the diagnosis of such vehicular malfunctions, passenger cars have been required, since 1996, to include an on-board diagnostic port (OBD port), or a diagnostic link connector (DLC). An OBD and DLC essentially comprises a plug-in type connector that is coupled to the on-board computer in the vehicle. The on-board computer is coupled to various sensors at various places within the vehicle, to sense the existence of a malfunction in the various locations of the vehicle. By plugging in an appropriate "scanner" device into the OBD or DLC, error codes can be retrieved from OBD or DLC. These error codes provide information as to the source of the malfunction.

Typically, the scanner devices used today to retrieve such error codes from an OBD or DLC port are large, complex, and importantly expensive. The devices typically include a data processing computer, having a cable that can be coupled to the OBD or DLC port. The error codes are retrieved from the vehicle, and fed into the processing unit of the device. The processing unit of the device includes software for processing the information retrieved from the error code, which, along with a database of information, correlates the error codes to specific vehicle malfunction conditions.

In order to properly process data received from the DLC or OBD port, the diagnostic device is required to have a substantial amount of processing capability in order to process the retrieved data, a substantial database of information about the particular vehicle from which the data is retrieved, and which correlates the error codes to the particular malfunctions; and a display (either electronic, or through a printer) that is capable of displaying or printing out a message in some format. This format can take the form of either an error code (e.g. error number P0171), or some natural language description of the error (e.g. system too lean (bank one)).

Because of the processing, storage and display requirements attendant to such a device, the cost of such a device is usually outside of the range desired by most automobile owners, and even some smaller automobile service facilities. As such, prior to the present invention, the only persons who typically possessed such diagnostic devices were automobile service facilities such as service stations, automobile repair shops and automobile dealerships.

One difficulty with the isolation of such diagnostic devices within the hands of service personnel (as opposed to consumers) is that consumers are often denied the opportunity to have access to diagnostic information about their vehicle, thus putting consumers at the mercy of the service repair facility.

Unfortunately, economic factors, ethical laxity, and lack of knowledge conspire too often, thereby causing unnecessary repairs to be made to vehicles, and hence, from the consumer's perspective, unnecessary expenses to be incurred in the repair of their vehicles.

This problem is not inconsequential. According to a National Highway and Traffic Administration report, of the approximately $50 billion dollars spent annually in America for automobile repair and maintenance, roughly $20 billion dollars of this amount is spent on unnecessary or fraudulent repairs. Statistically, this means that 40 cents of every dollar spent on automobile repair in America is at worst, wasted, and at best, unnecessary.

Because of the high cost of automobile repair, and the unfortunate high incidence of unnecessary and fraudulent repairs, many consumers live in dread of an automotive malfunction and the required trip to an automobile service facility. The consumer's fear is exacerbated by the fact that the complexity of contemporary automobiles precludes most consumers from diagnosing the problems themselves. As such, the consumer is left to the mercy of the automobile technician who informs the consumer of the malfunctions, and suggests the repair therefor. Since the consumer cannot diagnose the problems herself, the consumer is never quite sure whether the service technician is being truthful, or alternately, suggesting repairs that need not be performed. This fear is often exacerbated by the fact that many repair facilities pay their service writers commissions for the services and parts "sold" by the service writer.

Admittedly, this problem with consumer ignorance could be mitigated if the consumer were to have her own scanner type diagnostic device. However, this solution is not practical, as such scanners typically sell for $500.00 to $3,000.00. Additionally, various adaptors and data cartridges must be purchased for different types of vehicles. Most importantly, few, if any of these scanners provide output in a form that is of value to a non-mechanic layperson. In summary, the cost of such a scanner, when all parts and databases are assembled, can exceed the price and usefulness where it would be profitable for consumers to purchase them. Examples of such scanners are sold by Snap-On, Inc. of Waukegan, Ill., and can be seen at www.snapon.com. One such illustrative scanner is the Snap-On, Super-Deluxe graphing scanner, Stock No. MTG25002900.

As the cost of such a scanner is beyond the practical affordability of most consumers, it is easy to deduce that providing consumers with currently existing scanners provides no real, economically viable solution for consumers.

Therefore, it is one object of the present invention to provide a device that is small enough, and can be manufactured inexpensively enough to allow consumers to retrieve error codes from their vehicle diagnostic system, to therefore be better informed of the malfunctions visiting their vehicles.

IV. SUMMARY OF THE INVENTION

According to the present invention, a vehicle monitoring and maintenance device is capable of being connected to a diagnostic port of a vehicle. The monitoring and maintenance device comprises a hand holdable, data acquisition and transfer device. The data acquisition and transfer device includes a first data link connectable to a diagnostic port of a vehicle for retrieving diagnostic data from the vehicle; and a second data link connectable to a global computer network communicable device. The data acquisition and transfer device also includes a processor and memory unit capable of retrieving unprocessed diagnostic data containing error codes from the vehicle via the first data link, storing unprocessed diagnostic data for a period of time, and transferring the unprocessed data to the global computer network communicable device, to the second data link. The hand holdable data acquisition and transfer device lacks sufficient data processing capability to fully process the unprocessed diagnostic data into human useable diagnostic information.

Preferably, the processor and memory unit of the hand holdable data acquisition and transfer unit includes a random access memory (RAM) and preferably a Non Volatile Random Access Memory (NVRAM) for storing the operating system, and a non-volatile random access memory for storing the unprocessed diagnostic data retrieved from the vehicle. This non-volatile random access memory can comprise a flash memory. Additionally, the network communicable device can comprise a personal computer such as a desktop, notebook, or personal data assistant that is capable of communicating, through a global computer network, to a server. This server contains sufficient processing capability for processing the unprocessed data transmitted by the personal computer into natural language diagnostic information.

In accordance with another embodiment of the present invention, a method is provided for monitoring and maintaining a vehicle having a diagnostic port. The method includes the retrieval of unprocessed data from a diagnostic data port of the vehicle by employing a hand holdable data acquisition and transfer device. The data acquisition and transfer device comprises a first data link connectable to a diagnostic port of the vehicle for retrieving unprocessed diagnostic data from a vehicle, and a second data link connectable to a global computer network communicable device. The data acquisition and transfer device further include a processor and memory unit capable of retrieving unprocessed data from the vehicle via the first data link; storing the unprocessed diagnostic data for a limited period of time; and transferring the unprocessed data to a global computer network, through the second data link. The hand holdable data acquisition and transfer device lack sufficient data processing capability to fully process the unprocessed diagnostic data into human useable diagnostic information.

The data from the data acquisition and transfer device is transferred to a global computer network communicable device. The partially unprocessed data is transferred, via a global computer network, from the global computer network communicable device to a server. A server is provided that includes software having diagnostic information necessary to identify, from the unprocessed data, sources of conditions within the vehicle giving rise to error codes in the unprocessed data. The server is used to process the unprocessed data, and to prepare a vehicle condition report in a natural language. The vehicle condition report is transferred, via the global computer network, to a global communicable network communicable device.

Preferably, the vehicle condition report is transferred back to the global network communicable device of the person who submitted the unprocessed data, so that the vehicle owner or service technician can learn about the malfunction conditions affecting his or her car. Alternately, the data can be communicated to a third party, such as a vehicle service provider, a vehicle evaluator, or a vehicle manufacturer. Additionally, the preferred method also includes providing the server with a data base including labor data, and parts data, and in particular, labor costs (or time interval) data, and parts cost data. This labor and cost data can be correlated with the identified vehicle malfunctions, to provide the consumer with an estimate of the cost of repairing the vehicles.

One feature of the present invention is that data acquisition device of the present invention lacks sufficient data processing capability, including memory capability, to fully process the unprocessed diagnostic data into human-useable diagnostic information. This feature has the advantage of enabling the device to be manufactured much less expensively than prior known devices.

The Applicants believe that the high costs of known scanners results primarily from the primary high-cost components within traditional scanner-type devices such as their processing units, memory units, and display units. As alluded to above, converting the error codes retrieved from a vehicle into a human readable and understandable action report, that either suggests the cause of the error, or preferably, suggests a proposed solution to the malfunction, requires that the scanning device include a database. This database must contain information about vehicular error codes, and be capable of correlating these error codes with the malfunction to which they relate. The size of the database is large due to the large number of vehicle manufacturers, and vehicle models that contain a variety (and sometimes a large number) of error codes.

The existence of a large database mandates significant "data crunching" capabilities within a data processor that requires a rather fast and powerful processing unit. As such, the combination of a large memory unit to hold the large amount of data, when coupled to the need for a fast, powerful processor requires the device to include expensive components to ensure the proper operation of the device. Additionally, in order to display the error codes in a user-readable format, a multi-line display, of the type that one might find on a typical personal data assistant is also required.

It follows therefore, that a device that avoids the need for a large amount of memory and processing capability, along with an expensive display, can be manufactured much less expensively than one requiring a large memory, powerful processors and a sophisticated display.

Although the Applicants' invention does not eliminate the need for significant memory, processing capabilities and displays, the Applicants' invention obviates the need for such high-cost components within the hand holdable device of the present invention, by permitting the user to rely on the high-cost components that the user likely already possesses (or has access to), such as the processing memory and display components within the Applicants' personal computer or one at his local library. Additionally, by employing a web-accessible server to perform the majority of the data crunching and the database maintenance functions, the Applicants' invention further reduces the component investment that must be born by the vehicle owner/consumer.

In summary, by reducing the technological requirements of a hand holdable unit in favor of relying on technological components of the user's already-existing personal computer, an offsite database system, and a service providers' web server, the hand holdable device that performs the unique function (relative to the computer and the web server) of retrieving data from the particular vehicle is reduced in cost to the point where such a hand holdable device can be produced within a range that can be afforded by most vehicle owner/consumers, and that represents a good investment for vehicle owners and consumers, when compared to currently existing devices. The frequency of breakdowns of many vehicles over their normal service life, and the cryptic nature of output from currently produced devices is not likely to justify the $2,000 to $3,000 investment required with many currently available devices, even if the use of such a current device would permit the user to save the estimated 40% "wasted services" fees discussed above. However, a device that is priced at somewhere between 5% and 10% (or so) of such currently known devices, and preferably at less than $100.00, would provide a good investment for the consumers, and, might likely pay for itself in one or two trips to the repair shop, through the savings gained by enabling the consumer to avoid unnecessary services.

These and other features of the present invention will become apparent to those skilled in the art upon a review of the detailed description and drawings presented below, which set forth the best mode of practicing the invention perceived presently by the applicants.

V. BRIEF DESCRIPTION OF THE DRAWINGS

VI. DETAILED DESCRIPTION

Figure 1:
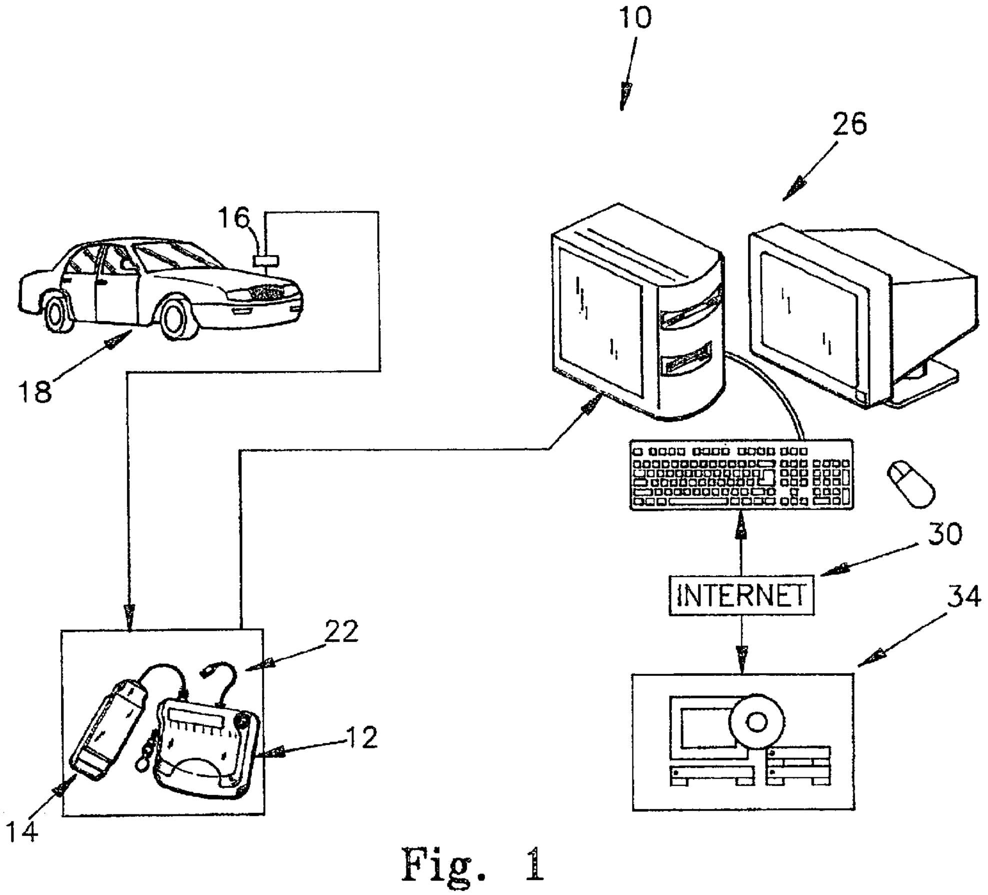
FIG. 1 is a schematic view illustrating the device and method of the present inventions.
Figure 2:
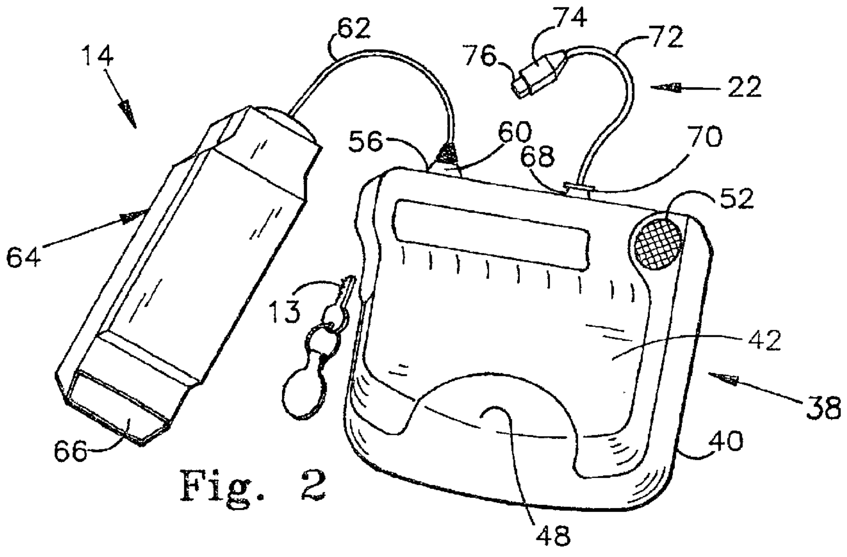
FIG. 2 is a perspective view of the device of the present invention.

The vehicle monitoring and maintenance system of the present invention is best understood with reference to FIGS. 1 and 2, as including a hand holdable data acquisition and transfer device ("DAT device") 12. DAT device 12 is preferably hand holdable, and is sized to be small, having a size generally similar to a business card, a deck of playing cards or a pack of cigarettes. A set of keys 13 is shown along side of the DAT device 12 to help provide some perspective as to the preferred size of the DAT device 12.

The DAT device 12 includes a first data link 14 that is capable of communicatively coupling the DAT device 12 to a data port 16 such as an OBD II port 16 of a vehicle 18, such as a passenger car or truck. The DAT device 12 also includes a second data link 22 that is capable of communicatively coupling the DAT device 12 to a global computer network communicable device, such as a personal computer 21, or other global communicable devices, such as personal data assistants, notebook computers and certain types of cellular phones.

The personal computer, or other Internet communicable device is connected, through a global communications network, such as the Internet 30 to a server 34. The server 34 preferably comprises a web server maintained by a diagnostic service organization. The primary attributes of the server 34 are its processing speed to process data transferred to the server 34 from the DAT device 12, which data comprises largely unprocessed data that is retrieved from the vehicle 18. Additionally, the server 34 includes a database of information so that the error codes retrieved from the car can be correlated with error and malfunction data, so that error codes can be interpreted into information relating to the source of the problem, or alternatively, to solution information for fixing the problem that relates to the particular error code received.

Additionally, the server 34 can include database of parts, part costs, and labor costs. The purpose of including this data within the server's database is to provide the user with an estimate for repairing the problem suggested by the vehicle error codes, and/or any solutions proposed by the server 34. Other functions of the server 34 will be described below in connection with the description process of the present invention.

The primary purpose of the personal computer 26 or other global network communicable device is to provide a device, to which the user already likely has in his possession, or at his disposal, that provides: (1) limited processing capability; (2) Internet communication capabilities; and (3) information display capabilities. Most computers and personal data assistants already include some sort of screen, such as a typical CRT type computer screen, LCD screen, or some other type of screen that is capable of displaying significant amounts of data and images. Additionally, most computers and PDAs also include communication capabilities for establishing an Internet connection to transfer data to the server, along with sufficient processing capabilities to perform whatever minor processing operations are necessary, in order to retrieve the error codes from the DAT device 12 into the personal computer, and to temporarily store the unprocessed data, and place the data into a form where it can be communicated to the web server 34.

The hand held DAT device 12 is best described with reference to FIGS. 1 and 2. As discussed above, the primary function of the DAT device is to retrieve error codes from the OBD II port 16 of the vehicle 18 and to temporarily store the data so retrieved, and then to transfer the error code data so retrieved to the personal computer 26, and ultimately to the web server 34. Importantly, the DAT device 12 is not designed to include sufficient display or processing capabilities to process the error codes on its own, or to display the results of the processed data on its display.

The DAT device 12 is designed in this manner to enable the device to be manufactured at a relatively low cost, as the memory required to maintain all of the database information, the processing speed required to correlate the error codes with the error code database information, and the display capabilities required to display information about the problems discovered during the processing of the error codes comprises generally expensive components. Although the capability of these processing, display, communication and memory components are still necessary, these capabilities already exist within devices, such as personal computers 26, and the web server 34.

As computers are available to most persons, either through their ownership of a personal computer, or through access to a computer in a public library, there is no need for the user to purchase redundant components that include the display, processing and memory capabilities of a personal computer within the error code retrieval device. Rather, the user can rely on those existing already within the personal computer. Although the user's personal computer 26 may not include error code database information, or have the processing capability of processing the error code data and correlating it with the error code database information, these capabilities can easily be contained within the web server 34. By utilizing the capabilities of the web server to process the data, and to contain the error code database information, these capabilities may not be absent in the DAT device 12, and hence the user need not pay for these capabilities. Rather, the user can "rent" these capabilities on a "as needed" basis, by feeding the error code information retrieved from the vehicle 18 by the DAT device 12, into his personal computer 26 and ultimately into the web server 34.

The use of a web server 34 to contain the database information, and process the information has significant advantages over the use of a personal computer 26, as the error database information that exists for all of the vehicles and vehicle models is quite large, thus requiring a significant amount of both memory capability and processing speed. Performing these operations on a personal computer might likely tie up resources on the personal computer, or possibly, overwhelm the memory and processing capabilities of the user's personal computer 26. Additionally, the use of the web server 34 permits the user to process the data expeditiously, even if the user's computer has very little memory and a very low relative processing speed.

The DAT device 12 includes a case 38 that is preferably comprised of two-pieces, a lower shell 40 and an upper shell 42, which can be attached together either permanently, or such as by ultrasonic welding, or removably attached through the use of screws to join the lower and upper shells 40, 42 together, or held together through an elastic wide rubber-band like member 269 (FIG. 5) that holds the two shells together. The upper shell 42 includes a small, LED display that is designed to be generally rudimentary in nature. For example, the LED display can include 4 LED type-lights that are placed adjacent to printed insignia to indicate four operational states of the device, such as "power on", "retrieving data", "resetting error codes", and a "transmitting data" state. Alternately, four LEDs can be utilized to light up a translucent display containing display indicia messages, such as those described above.

In designing the DAT device 12, the LED display 46 is preferably designed to be as simple and rudimentary as possible, while still conveying information necessary to the user. The LED display 46 is designed to be made substantially less expensively than a full-screen type LCD display the type that one might find on a personal data assistant, or a notebook computer.

The operation of the DAT device 12 is controlled through a pair of buttons, including an on-off operation button 48, and a data reset button 52. The on-off operation button 48 can be designed to be a sequence type button, wherein successive pushes of the button 48 move the device, for example from an off-state, to an on-state, to a data retrieve-state, and to a data transfer-state. Alternately, the on-off button 48 can be designed to work in tandem with the data reset button, wherein the on-off operation button cycles through the various operations that the DAT device 12 is capable of, with the data reset button 52 serving as an "enter" button which tells the DAT device 12 to execute the particular operation illustrated.

The data reset button is designed to be actuated after the DAT device 12 has retrieved the error codes 12 from the car. The data reset button 52 can be actuated, for example, to resend a signal through the on-board data port 16 of the vehicle 18, to reset the error codes within the vehicle 18. Alternatively, the data reset button 52 can be employed to erase the error codes contained within the non-volatile RAM type memory of the DAT device 12, after the error codes contained with the non-volatile RAM have been transferred out of the DAT device 12, and into the personal computer 26.

The DAT device 12 includes a first port 26 that is sized and configured for receiving an appropriate plug 60 which is disposed in the first end of a data transfer cable 62. Preferably, the plug 60 comprises of serial port-type plug which is sized and configured for being received within the first port 56.

Cable 62 terminates, at its distal end, in a data port interface plug 64. Data port interface 64 is sized and shaped to be received into the OBD II port of the type that is contained on vehicles. As compatibility with the OBD II port of vehicles is important, the data interface plug 64 should be designed to mate to the OBD II port 16. As is common with many such computer interface type connector plugs, the data interface plug 66 includes an array of pins at the pin receiving end of 66 of the data interface plug 64 which are sized and arrayed to mate with the corresponding female receptors of the OBD II port 16 of the vehicle 18.

The DAT device 12 also includes a second port 68 that is preferably a USB type port. As the primary purpose of the first port 56 is to provide a gateway through which data retrieved from the OBD II port 16 of the vehicle can be transferred into the DAT device 12. Additionally, in a non-self-powered (battery-less) version of the device 12, the first port can be used to power the device 12 when it is attached to the computer 26 or vehicle 16. The second port 68 is designed primarily to serve as a gateway through which error data contained within the DAT device 12 can be transferred to the personal computer 26. The second port 18 is sized and configured for receiving a first USB connector 70 that is disposed at a first end of a cable 72. The second USB is connector 74 is disposed at the distal end of the cable 72, and has a connector end 76 that includes a plurality of pins (or female receptors) that are designed to be received by a USB port of a type typically found on personal computers and PDAs.

In lieu of the USB connector and serial port connectors discussed above, other connector types can be used with the present invention, with the type of port and connector chosen being determined largely by compatibility concerns.

Figure 5:
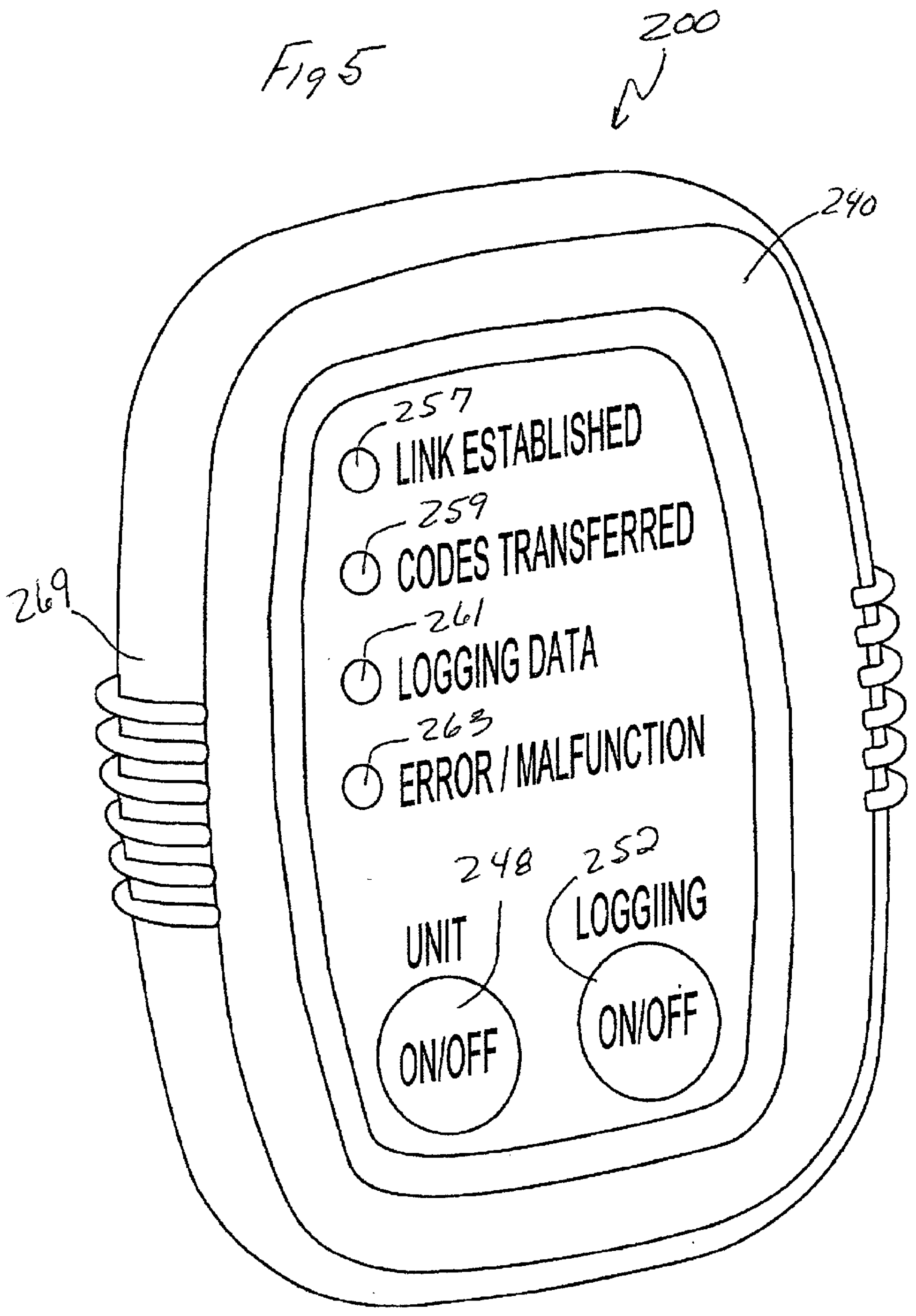
FIG. 5 is a perspective view of an alternate embodiment DAT device of the present invention.

An Alternate embodiment DAT device 212 is shown in FIG. 5 as including a case 238 that is preferably comprised of two-pieces, a lower shell (not shown) and an upper shell 242, which are attached together by an elastic rubber band like gripping and joining ring 243. That removably attaches the shells together The upper shell 242 includes an LED display that is designed to be generally rudimentary in nature. The LED display can include 4 LED type-lights that are placed adjacent to printed insignia to indicate four operational states of the device, such as "Link Established", "codes transferred", "Logging Data", and a "Error/Malfunction." Alternately, four LEDs can be utilized to light up a translucent display containing display indicia messages, such as those described above.

In designing the DAT device 212, the LED display 246 is preferably designed to be as simple and rudimentary as possible, while still conveying information necessary to the user. The LED display 246 is designed to be made substantially less expensively than a full-screen type LCD display the type that one might find on a personal data assistant, or a notebook computer.

The operation of the DAT device 212 is controlled through a pair of buttons, including a unit on-off operation button 248, and a logging button 252. The on-off operation button 48 turns the device on and off, and the logging button 252 is designed to be a sequence type button, wherein successive pushes of the button 252 move the device, for example from a data retrieve state to a data transfer-state.

The software that controls the device 212 is designed to send a signal through the on-board data port 16 of the vehicle 18, to reset the error codes within the vehicle 18, after the error codes have been successfully retrieved from the vehicle.

The DAT device 212 includes a first port and a second port that are similar in configuration and function to the first and second ports of Dat device 12.

The components that perform the data retrieval, storage and transfer functions performed by the DAT device 12 are contained within the hollow interior of the DAT device 12 formed when the upper and lower shell halves 40, 42 are matingly engaged together. These components are best shown with reference to FIG. 3.

The heart of the components is the main processor 84 which preferably comprise a dedicated type processing chip that is specially designed to be optimized to perform the functions performed by the DAT device 12. As discussed above, the main processor 84, although designed to perform the functions of the DAT device 12, is a processor of limited capabilities (and cost), as the primary functions of the DAT device, from a processing standpoint, are quite limited. A buss type connector 88 couples the processor to a non-volatile random access memory (NVRAM), such as a flash interface type device 90. The purpose of the flash type interface memory device 90 is to store the error codes that are retrieved from the vehicle 18.

A user interface 94 is coupled to the main processor 84 to control the operation of the processor. As discussed above, the user interface comprises two push button type actuators, such as the on-off operation actuator 48, and the data reset actuator 52. Additionally four LEDs are provided for being lit when appropriate, to give the user an indication of the particular operation then being performed by the DAT device 12. These LEDs can include a first LED that is lit when power is applied to the device (a power on indicator), a second LED that lights up when data is being retrieved into the DAT device 12 from the vehicle 18; a third LED that is lit when data is being transferred from the DAT device 12 to the personal computer 26, and a fourth LED that indicates another condition, such as that the data reset function of the device is actuated, to reset the error codes that are contained within the on-board data port 16 of the vehicle 18.

Alternatively, in lieu of the four LEDs, a simple alphanumeric single line seven element type display, the type typically found on hand held calculators can be employed. The use of a single line alphanumeric display increases the number of messages that are capable of being displayed to the user. Examples of such messages include things such as error, no data retrieved, data fully retrieved, done, memory full, delete memory, and other messages appropriate to the operation of the device.

The main processor 84 is joined with an OBD II co-processor 96. The function of the OBD II co-processor 96 is to contain specialized processing capabilities that are designed specifically for retrieving and transferring OBD II type data from a vehicle, and later for erasing the error codes contained within the OBD II port of the vehicle. A hardware reset control 104 is provided for actuating the error code reset function of the device. This error reset functionality can include both resetting the error codes within the vehicle 16, and also resetting the non-volatile random access memory 90, after an operation is complete, so that the non-volatile memory 90 will be cleared out, and capable of receiving additional information from another operation of the device.

The non-volatile memory 90 is designed to be able to retain data, even when power is not being applied to the device. In this regard, the non-volatile memory 90 operates similarly to a floppy disk, and even more similarly to the flash memory contained within a digital camera, which retains digital information of the picture, even when the camera is turned off, or its batteries are being changed, so that the user, at a later time, can retrieve the information from the flash memory, to transfer his pictures to his computer or printer. Similarly, turning off the DAT device 12 of the present invention, or removing all power by removing the batteries from the DAT device 12 will not cause the error code information contained within the non-volatile memory 90 to be erased. Therefore, the information can later be retrieved when power is reapplied, so that the error code data 90 contained within the non-volatile REM type memory 90 can be transmitted to the user's personal computer. In addition to the non-volatile memory 90, a 32K×8 EEPROM 98 is contained within the DAT device 12. The function of the EEPROM 12 is to contain "burned in" operational programming software for the device. Programs which enable the device to function, and to operate are contained within this EEPROM.

As an alternative, the device can be designed to operate without batteries by drawing power from either the car or the computer to which it is attached Our device is designed not to need batteries. In such case, the non-volatile memory 90 will still retain data when no power is applied.

OBD II interface electronics components are coupled to the OBD II co-processor. This OBD II interface electronics and software protocols are designed to permit the device to interface with the OBD II error port 16 of the vehicle 18, and to interface with the operation of the port, in order to enable data to be retrieved therefrom.

A voltage regulator 112 is coupled to the OBD II interface electronics 108, and the power source 116 is coupled to a voltage regulator 112. Preferably, the power source 116 comprises a set of batteries of appropriate voltage. Power source 116 can comprise rechargeable batteries, or batteries incapable of being recharged. Additionally, the power source 116 can include an adaptor interface for permitting the device to be coupled to an AC adaptor so that the device can be operated either without batteries, or even when the batteries are fully discharged, by plugging in the device into a nearby AC outlet. Alternately, the power source 116 can be configured to permit rechargeable batteries to be recharged by enabling the AC adaptor to the coupled to the rechargeable batteries within the power source 116, so, that between uses, the batteries can be recharged by placing the device in the cradle of a type similar to the recharging cradle of a type used frequently with battery driven power tools such as electric screwdrivers. In the embodiment 200 of FIG. 5, no device 200 contained power source exists, as the device draws its power from the computer or vehicle to which it is attached.

An OBD II connector port 56 is coupled to the OBD II electronics. As discussed above, the OBD II connector port 56 is provided for permitting the DAT device 12 to be coupled to the OBD II port 16 of a vehicle 18. Similarly, the USB interface connector port 68 is coupled to the main processor, for permitting the DAT device 12 to be coupled to the global computer network communicable device, such as personal computer 26.

Figure 3:
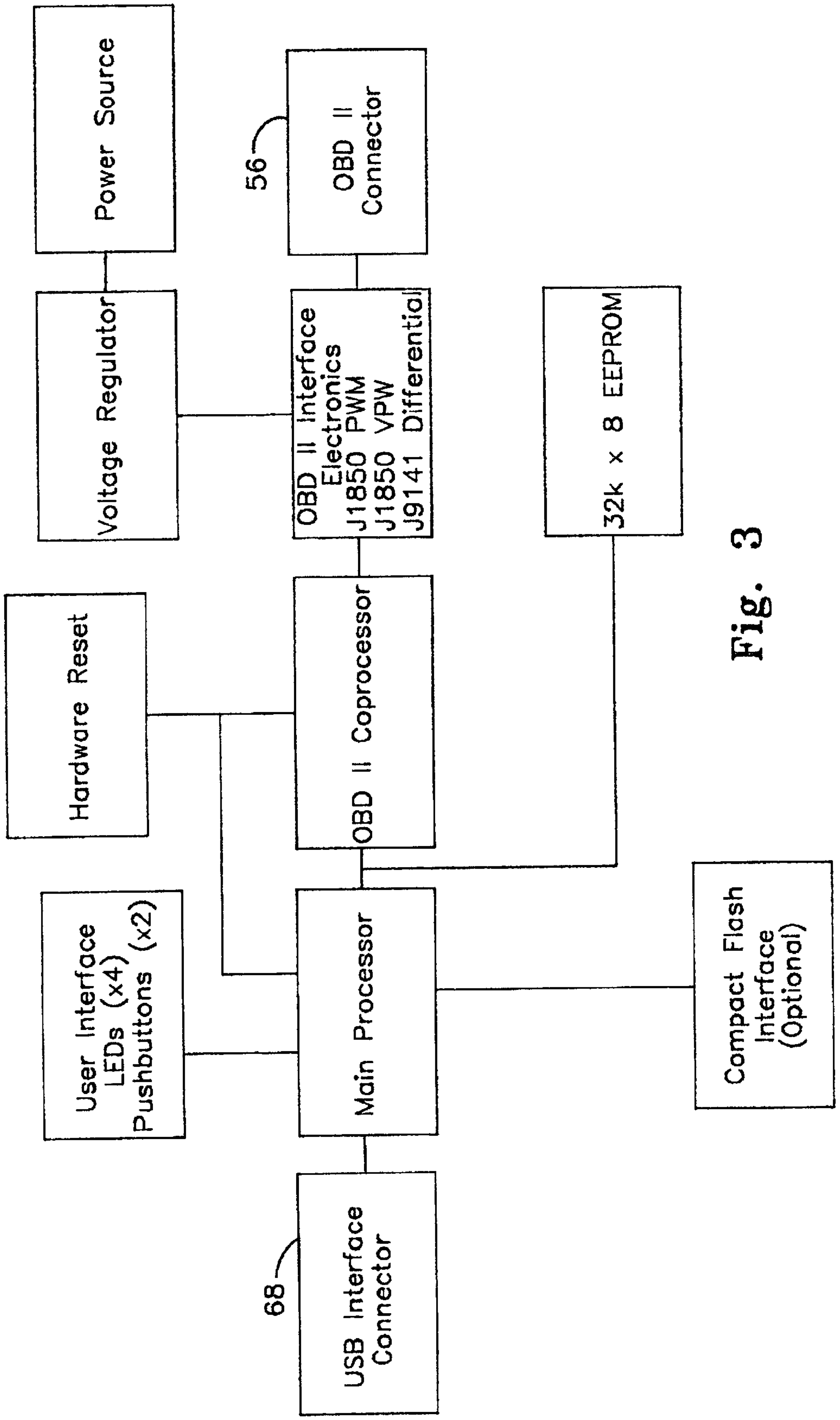
FIG. 3 is a schematic view of the internal components of the device of the present invention.
Figure 4:
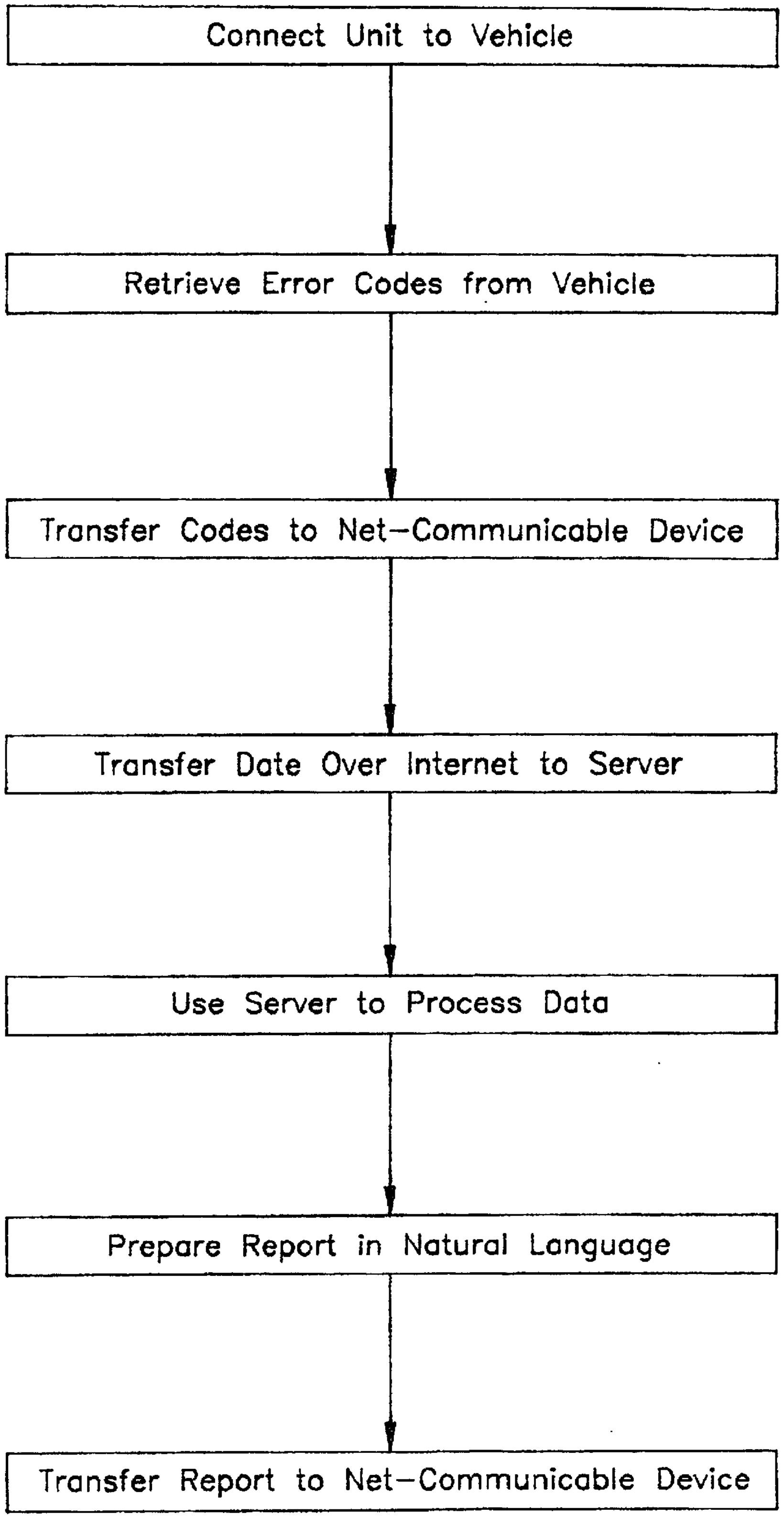
FIG. 4 is a schematic flowchart view of the process of the present invention.

The operation of the device will now be described with reference both to FIG. 4, which represents the schematic illustration of the method of the present invention, and also to FIGS. 1–3 which illustrate the electronic components of the present invention.

The first step in the use of the DAT device 12, for most customers, is an indication by their vehicle that a malfunction may be occurring. Typically this occurs when the malfunction indicator lamp of the vehicle is illuminated. On many vehicles, this lamp is the familiar "check engine" light on the dashboard display. Alternately, another reason for employing the device is the user's desire to verify that a recent repair job has been completed correctly. Still another use of the device is as a diagnosis tool by the user, as a prospective purchaser of a used car. It is also expected that some automobile maintenance buffs will wish to use the device even in the absence of other evidence of trouble, to determine whether any error codes exist within the vehicle that indicate that a problem that exists, or that a problem that has the potential to exist, even if such problem has not manifested yet by the illuminating of the check engine light.

To begin using the DAT device 12, the user first installs the power source (in versions of the device that are either battery or AC powered) into the DAT device 12. In devices which rely on external power sources (such as those devices 200 which obtain their power from being connected to the computer or vehicle, the power source is "applied" by connecting the device to the computer or vehicle. The first device-to-car cable 62 is coupled appropriately by connecting its first plug 60 to the first data link port 56 of the DAT device 12, and by connecting the plug end of 66 of the OBD II receiving plug 64 into the vehicle 18's OBD II port 16.

At this time, the device-to-computer cable 72 may also be attached to the device 12, by coupling the first end connector 70 to the second data link port 68 of the device 12. It is expected that at this time, the second end 76 of the USB port will not be coupled to the personal computer 26, as the user's personal computer 26 is likely not positioned in the driveway or garage where the user works on his car. Thus, the USB cable 72 is not connected to the second data link port 68, or else the second end 76 is left dangling and unconnected to any other devices, such as the computer.

Typically, the OBD II port is found under the dashboard of the car, thus requiring the user to plug in the OBD II port plug 64 into the OBD II port 16 contained under the dashboard. This OBD II port is also known as a data link connector. The exact placement of the data link connector 16 within the vehicle is variable, depending on the particular vehicle, its manufacturer, and the model of the vehicle to which the DAT device 12 is being connected.

The following description applies to the operation of the device 12 shown in FIGS. 1 and 2. After the connection between the OBD II plug port 16 and the data link connector 66 is made, the user presses the power button 48 of the device 12 to cause the device to power up. Preferably, the device 12 includes power management software that monitors the microprocessor 84 for activity, and, to conserve battery power, causes the device to turn off if not used within a predetermined interval, such as two continuous minutes.

The user next presses the on-off button 48 to cause the error codes within the vehicle's 18 OBD II computer to be retrieved from the computer, and to be transferred into the non-volatile memory 90 of the hand-holdable DAT device 12. When this button 48 is actuated to place the device 12 into the "retrieve codes" mode, an LED may be lit to indicate to the user that the device is so operating in this mode.

When the DAT device 12 is placed into its retrieve data mode, the device 12 will perform the following operations. First, the DAT device 12 will check for the presence of diagnostic trouble codes (DTCs), which are also known as error codes. If no error codes are stored within the OBD II computer 16 of the vehicle 18, this error-free condition will be indicated to the user, by either illuminating the appropriate LED, or else displaying an alphanumeric message. Upon the device 12 recognizing that no error codes exist, the device 12 then is then programmed to end the process, and perform no further steps.

However, if error codes are detected, these error codes are copies on to NVRAM 90 of the device 12. An indication, such as the lighting of an LED, or the display of an alpha numeric message is then given to the user to allow the user to know that the error codes have been copied successfully into the NVRAM. If the user so desires, the user can then press the device reset button 52. The pressing of the device reset button 52 causes the device to send instructions to the OBD II computer 16 of the vehicle 18 to delete the error codes from the memory of the vehicle's OBD II computer.

Because the error codes are stored in non-volatile RAM memory 90 of the device, the user may then turn the device 12 off to cut power to it, without fear that the error codes will be lost or otherwise removed from the device 12.

The following description applies to the operation of the device 200 shown in FIG. 5. After the connection between the OBD II plug port 16 and the data link connector is made, the user presses the power button 248 of the device 200 to cause the device to power up, from power obtained from the vehicle by virtue of the connection of the device 200 with the vehicle. The user next presses the logging button 252 button to cause the error codes within the vehicle's 18 OBD II computer to be retrieved from the computer, and to be transferred into the non-volatile memory of the hand-holdable DAT device 200. When this button 252 is actuated to place the device 12 into the "retrieve codes" mode, the first LED 257 will be lit to tell the user that a link has been established. When the retrieval of codes is successfully completed, the codes transferred LED 259 will be lit, and if an error or malfunction occurs during the process, the fourth, Error/malfunction LED 263 will be lit.

When the DAT device 200 is placed into its retrieve data mode, the device 200 will perform the following operations. First, the DAT device 200 will check for the presence of diagnostic trouble codes (DTCs), which are also known as error codes. If no error codes are stored within the OBD II computer 16 of the vehicle 18, this error-free condition will be indicated to the user, by shutting itself down.

However, if error codes are detected, these error codes are copies on to NVRAM 90 of the device 200. After the codes are successfully retrieved, the software within the device will automatically reset the error codes in the vehicle's computer. Because the error codes are stored in non-volatile RAM memory of the device 200, the user may then unhook the device 200 from the vehicle, thus cutting its power, without fear that the error codes will be lost or otherwise removed from the device 200.

Returning now to a description of the operation appropriate to both devices, 12, 200 (except where noted), the next step in the operation is for the user to decouple the OBD II computer plug 64 from the OBD II port 16 of the vehicle 18, and to couple the distal USB plug 74 of the USB cable 72 to the USB interface port of the user's personal data assistant, personal computer or notebook computer. Typically, this requires the user to transport the device 12 from the location of which the vehicle resides (typically the garage or driveway). The user then connects the distal end plug 74 to the USB port of his computer using the USB cable 72.

The customer then uses either a dial up or direct line connection to connect his computer 26 to the Internet, and opens his Internet browser. The user then navigates (or the device 12, 200 is programmed to self-navigate) to the appropriate website which allows the user to gain access to the server 34. First time customers may need to register certain desired information into the server 34, such as a serial number of the DAT device 12, and the vehicle identification number (VIN) of the vehicle from which the error codes were retrieved, along with a description of the vehicle. This information is necessary both for record keeping purposes, and also for enabling the server to identify the vehicle type from which the error codes were retrieved, as error codes are likely to vary for vehicles of different types.

Preferably the server 34 allows the user to list multiple vehicle identifications numbers, so that the DAT device 12 can be used with multiple vehicles. As discussed above, one of the features of the present invention is that it is movable between vehicles, and is compatible with most, if not all OBD ports of the type found on passenger vehicles, light trucks, sport utility vehicles, vans and the like. Through this, the user can purchase one device 12, and use it for all of his vehicles, even if the user obtains new vehicles. Additionally, this universal compatibility enables the user to loan the device 12 to friends and neighbors who might desire to use the device 12. Additionally, the universal compatibility of the device enables the device to operate with already existing car components, thus enabling the user to employ the device 10 without making any modifications to the vehicles on which the device 12 is used.

The website is designed to guide the user through a step-by-step process (or alternately is programmed to guide itself through the process) to enable the codes to be transferred from the device 12 and through the personal computer 26, across the Internet 30 and into the server 34 where the error codes can be processed.

On the device 200 of FIG. 5, the user transmits the codes by depressing the Logging button 252 until the third LED, the "logging data" LED illuminated. When the codes have been fully transferred, the "Codes Transferred" light may be illuminated to signify that the codes have al been successfully transferred to the server or computer. The codes are then transferred, or copied on to the server 34.

When the error codes have been successfully transferred from the device 12 to the server 34, the software contained within the server 34 matches the captured codes to code interpretations contained on the database contained on the server 34. The OBD II database, which interprets such codes, is in the public domain, and contains a list of several code records. Each record contains a DTC code and a brief description.

Additionally, the software includes an extended description/definition that is written in a natural language, and preferably, is written on a level which enable the typical consumer to understand the problems that exist in his vehicle. A second field of data contained in the database is a narrative of possible causes that give rise to the error code, along with additional troubleshooting steps that the user can take to help pinpoint the exact cause of the trouble, if such cause is not pinpointed by the error codes themselves. Finally, the additional material within the database can include suggested corrective measures that the user can employ to repair the malfunction in the vehicle detected by the error codes.

The error codes are processed by the software within server 34 to provide a human readable report in a natural language, that will be transferred back to the user in a natural language. For example, an output for a particular code can appear as follows:

DTC Number: P0171[from public domain data]

DTC Name: System 2 Lean (Bank One)[from public domain data]

Description: Error/Air level too high (text added by applicant's software)

Suggestions: It is possible that one or more fuel injectors are clogged. As an initial remedy, try a bottle of fuel injector cleaner. [Text to be added by applicant's software.]

In a fashion typical to the web, this transfer report will take the form a display upon the user's computer screen or PDA screen. The report will be configured so that the user, if he so desires, can copy the report, and paste it into a word processing program or an e-mail program, or configure it to print so that the report can be printed out on the user's printer. Additionally, the report is configured so that it can be downloaded or saved as a file, and downloaded on to the user's personal data assistant, to enable the user to then transport his personal data assistant to the repair shop, wherein the report can be re-displayed for the service technician.

Upon receipt of this information the user will be better informed as to the malfunction occurring in his car. In certain cases, the user may be able to use this information to perform the repairs necessary on the car. In the example given above, the user can perform the first step of the repair by adding a container of fuel injector cleaner to his gas tank. Other repairs may require more extensive mechanical intervention, which the user may or may decide to perform.

Alternately, the user can take the information retrieved from the error codes, and take the report to a repair station where a service technician will perform the repairs. By having the report, the user will help to ensure that only necessary repairs are performed, and thus, help to save money by avoiding unnecessary repairs being performed by the technician. Additionally, the user may be able to save diagnostic charges imposed by the service technician, by already having had the diagnostic test run on the vehicle. Alternately, the information can be used to test the integrity and knowledge of the service technician, by comparing the report given by the device 12 against repair suggestions made by the service technician.

As a further service to the consumer, the consumer may choose to run a second diagnostic test on his vehicle 18 using the device 12 after the repairs are made, to ensure that the technician corrected all malfunctions in vehicle.

Other functions can be performed by the device 12 that are in addition to the functions performed by server 34 that are listed above. For example, the database can include data relating to part costs and labor costs. This information may be correlated with the detected error and the suggested remedy to the error to give the user an estimate of the repair costs of his vehicle. For example, if the error code retrieved from the vehicle indicates that the user's alternator is malfunctioning, the labor and parts data database can inform the user that the typical price range of an alternator of the user's vehicle is between $50 and $60, and inform the inform the user that the typical time interval charge for the replacement of an alternator is one hour, and that the typical labor rates of repair shops within the user's locality are between $40 and $60 per hour, thus giving the consumer a repair estimate of between $90 and $120. Additionally, the database of labor and costs data can be linked to labor rate information and parts costs information of particular service providers, such as Pep Boys® or Wal Mart® to enable the part costs and labor data to be made more precise by informing the user, for example, that he can obtain an alternator for his car at Pep Boys® for $55, which can be installed for one hour of labor, for which Pep Boys® charges $50, thus giving the user a more precise estimate of $100 for the repair of his vehicle.

The server 34 database field that contains repair suggestions should preferably be an expert type database that is built used from the knowledge base gained from expert mechanics. Additionally, the server can contain historic data for vehicles that, through the accumulation of data for large numbers of vehicles of a certain type, can suggest possible solutions to the malfunctions based on the knowledge gained from other users of the device 12.

One feature of the server 34 of the present invention is that it can store the error code information retrieved from users. This information will permit data mining by service organizations and automobile manufacturers, and the development of neural networks and expert systems. For example, the server 34 can correlate data about particular vehicle types, and prepare a report of malfunction incidents by vehicle type, and by malfunction type within a certain vehicle model. This data can then be transferred to a manufacturer or service organization.

For example, the existence of a large number of alternator malfunctions that correspond to a certain vehicle type can be correlated into a report, which is then provided to a manufacturer of the particular vehicle type, so that the manufacturer will be aware of the problem, and can take steps to redesign or improve the design of its alternator. Additionally, the same information can be transmitted to service facility organizations, such as Pep Boys®, to better help Pep Boys® purchase their inventory of repair parts, and better target market consumers. Additionally, such data may be desirable to an automobile evaluation organization, such as Consumer Reports®, or an insurance trade group, so that they may provide better evaluations of vehicles to their customer base. In summary, the reports prepared by the server 34 may be delivered not only to the user, but also to third parties who would find the information useful.

Additionally, the error codes for a particular vehicle will be maintained within the database to enable the user to retrieve historical information relating to his car, so that the user will have a diagnostic history of his vehicle, which may be useful both to the owner, and to prospective purchasers of the user's vehicle.

In addition to the device described above, the device can include additional features. For example, the device can be designed to have an infra-red data transfer capability so that the device can transfer information wirelessly to a computer, and it can contain Bluetooth support for data transfer from the device to a personal computer and any other device with Bluetooth support. As will be appreciated, a Bluetooth transfer involves the use of a short distance radio transfer link.

Further, the device can be designed to contained limited transfer capabilities, which may obviate the need for a personal computer, but which will still enable the device to be produced inexpensively. For example, the device can be designed to be coupled directly to a phone jack, and have limited communication capabilities, so that the device can automatically dial a toll free number, preprogrammed into the device, and can transfer data directly to the server 34 without the intervention of a computer 26. The diagnostic report in human readable, natural language format can then be transferred to the user by facsimile or mail, thereby enabling the device to be used even by those without a computer or personal data assistant.

As alluded to above, the device can be designed so that the server contains some expert system help. An expert system is software that contains numerous logic "trees" which are created and populated by human experts, including, in this case, mechanics that are familiar with vehicle malfunctions and solutions therefor. This expert system can be developed into a neural network that continuously analyzes its own output learns from its own results, much in the way that humans do. This process continually updates and improves its software logic, which in turn, provides more accurate diagnoses, and more precise solutions for fixing the problems uncovered by the error codes.

Having described the device in detail with reference to certain preferred embodiments, it will be appreciated that variations and modifications exists within the scope of the present invention, as set forth within the appended claims.

What is claimed is:

1. A vehicle monitoring and maintenance device capable of being connected to a diagnostic port of a vehicle, the monitoring and maintenance device comprising a hand holdable data acquisition and transfer device including (a) a first data link connectable to a diagnostic port of a vehicle for retrieving diagnostic data from the vehicle;

(b) a second data link connectable to a global computer network communicable device; and (c) a processor and memory unit capable of retrieving unprocessed diagnostic data containing error codes from the vehicle via the first data link, storing the unproccessed diagnostic data for a time period, and transferring the unprocessed data to the global computer network communicable device, through the second data link wherein the global computer network communicable device is capable of communicating, over a global computer network, with a server containing a processor and a database for processing the unprocessed diagnostic data into natural language diagnostic information, and wherein the hand holdable data acquisition and transfer device lacks sufficient data processing capability to fully process the unprocessed diagnostic data into human-useable diagnostic information.

2. The vehicle monitoring and maintenance device of claim 1 wherein the first data link includes at least one of a cable and a wireless data transmitter capable of transferring data between the data acquisition and transfer unit; and at least one of an OBD and datalink port of the vehicle.

3. The vehicle monitoring and maintenance device of claim 2 wherein the at least one of the cable and wireless data link comprise a cable selectively attachable to the at least one of the OBD and data link port of the vehicle.

4. The vehicle monitoring and maintenance device of claim 1 wherein the global computer network communicable device comprises a personal computer, and the second data link includes at least one of a cable and wireless transmitter capable of transmitting data between the data acquisition and transfer unit; and the personal computer.

5. The vehicle monitoring and maintenance device of claim 1 wherein the processor and memory unit of the hand holdable data acquisition and transfer unit includes sufficient processing capability and memory to include reset codes for a plurality of vehicle types, and to be capable of communicating the reset codes to the vehicle, to reset error codes contained within the vehicle.

6. The vehicle monitoring and maintenance device of claim 1 wherein the processor and memory unit of the hand holdable data acquisition and transfer unit includes a random access memory for storing the operating system, and a non-volatile random access memory for storing the unprocessed diagnostic data retrieved from the vehicle.

7. The vehicle monitoring and maintenance device of claim 1 wherein the non-volatile random access memory comprises a flash memory capable of retaining the unprocessed diagnostic data retrieved from the vehicle, even in the absence of an electrical power source.

8. The vehicle monitoring and maintenance device of claim 1 wherein the hand holdable device includes a battery power source, and at least one of the first and second data links communicating with the respective vehicle and global computer network communicable device through a short range radio link.

9. The vehicle monitoring and maintenance device of claim 8 wherein the short range radio link comprises a bluetooth-type short range radio link.

10. A vehicle monitoring and maintenance system designed for use by vehicle owners comprising (1) a hand holdable data acquisition and transfer device including (a) a first data link connectable to a diagnostic port of a vehicle for retrieving diagnostic data from a vehicle diagnostic system;

(b) a second data link connectable to a global computer network communicable device, the global computer network communicable device comprising a personal computer capable of communicating through a global computer network; and (c) a data capture and memory unit capable only of retrieving unprocessed diagnostic data from the vehicle via the first data link, storing the unprocessed diagnostic data for a time period, transferring the unprocessed data to the global computer network communicable device, through the second data link, and transferring reset codes to the vehicle diagnostic system wherein the hand holdable data acquisition and transfer device lacks sufficient data processing capability to fully process the unprocessed diagnostic data into human-useable diagnostic information, and (2) a remotely located server capable of communicating, over a global computer network, with the personal computer, the server containing a database of information relating to a wide variety of vehicles and a processor having sufficient processing capability for processing the unprocessed data transmitted by the personal computer into natural language diagnostic information, and transmitting the natural language diagnostic information back to the personal computer for presentation to a user.

11. The vehicle monitoring and maintenance device of claim 10 wherein the personal computer comprises at least one of a desk top computer, notebook computer and a personal data assistant.

12. The vehicle monitoring and maintenance device of claim 10 wherein the server includes software having diagnostic information necessary to identify, from error codes in the unprocessed data, sources of conditions within the vehicle giving rise to the error codes, and suggested corrections for the conditions so identified.

13. The vehicle monitoring and maintenance device of claim 10 wherein the server includes data relating to historic vehicle condition information, the data relating to historic vehicle condition information being comparable with current error codes in the data, for providing suggested corrections to conditions represented by the current error codes.

14. The vehicle monitoring and maintenance device of claim 10 wherein the server includes a database of repair cost data including labor data and parts cost data, the server being capable of correlating the labor data and cost data with the vehicle condition to provide a cost of repair estimate.

15. The vehicle monitoring and maintenance device of claim 10 wherein the server includes software having diagnostic information data for identifying sources within the vehicle giving rise to error codes, and suggested corrections for the conditions so identified, for substantially all passenger vehicle types having diagnostic ports.

16. The vehicle monitoring and maintenance device of claim 10 wherein the server includes software having diagnostic information data to identify malfunction conditions within the vehicle giving rise to error codes, an expert component capable of correlating the sources within the vehicle giving rise to error codes with potential solutions for correcting the malfunction conditions, said solutions being presented in a natural language format.

17. A method of monitoring and maintaining a vehicle having a diagnostic port comprising (1) retrieving unprocessed data from a diagnostic data port of a vehicle by employing a hand holdable data acquisition and transfer device designed for use by vehicle owners, the data acquisition and transfer device comprising:

(a) a first data link connectable to a diagnostic port of a vehicle for retrieving unprocessed diagnostic data from a vehicle, (b) a second data link connectable to a global computer network communicable device; and (c) a data capture and memory unit capable of retrieving unprocessed data from the vehicle via the first data link, storing the unprocessed diagnostic data for a limited time period, and transferring the unprocessed data to the global computer network, through the second data link, wherein the hand holdable data acquisition and transfer device lacks sufficient data processing capability to fully process the unprocessed diagnostic data into human-useable diagnostic information;

(2) transferring the data from the data acquisition and transfer unit to a global computer network communicable device, (3) transferring the data, via a global computer network, from the global computer network communicable device to a server, (4) providing a remote server including software having diagnostic information necessary to identify, from the unprocessed data, sources of conditions within the vehicle giving rise to error codes in the unprocessed data, (5) using the remote server to process the unprocessed data and to prepare a vehicle condition report in a natural language; and (6) transferring the vehicle condition report, via a global computer network, to a global computer network communicable device, for displaying the vehicle condition report in a natural language thereon.

18. The method of monitoring and maintaining a vehicle of claim 17 wherein the step of using the server to prepare a vehicle condition report includes the step of preparing a vehicle condition report containing suggestions for correcting non-normal conditions in the vehicle.

19. The method of monitoring and maintaining a vehicle of claim 17 wherein the step of providing a server including software includes the step of providing a server having software including a database of error codes for substantially all passenger vehicles having diagnostic ports.

20. The method of monitoring and maintaining a vehicle of claim 19 wherein the step of using the server to process the unprocessed data from a plurality of vehicles, includes the step of using the server to process unprocessed data from the plurality of vehicles and to prepare a vehicle type performance report relating to type and frequency of error codes specific to a particular vehicle type, and the step of transferring the vehicle condition report comprises the step of transferring a vehicle type performance report to a third party other than the party submitting unprocessed data to the server.

21. The method of monitoring and maintaining a vehicle of claim 17 wherein the step of providing a server including software includes the step of providing a server having a database of labor data and parts cost data, the software being capable of correlating the labor data and cost data with the vehicle condition to provide a cast of repair estimate.

22. The method of monitoring and maintaining a vehicle of claim 17 wherein the step of providing a server including software includes the step of including software having diagnostic information to identify malfunction conditions within the vehicle giving rise to error codes, and an expert component capable of correlating the malfunctions within the vehicle giving rise to error codes with potential solutions for correcting the malfunction conditions, said solutions being presented in a natural language format.

23. A vehicle monitoring and maintenance device capable of being connected to a diagnostic port of a vehicle, for the monitoring and maintenance device comprising a hand holdable data acquisition and transfer device including (a) a first data link connectable to a diagnostic port of a vehicle for retrieving diagnostic data from a vehicle diagnostic system;

(b) a second data link connectable to a global computer network communicable device; and (c) a data capture and memory unit capable generally only of retrieving unprocessed diagnostic from the vehicle via the first data link, storing the unprocessed diagnostic data for a time period, transferring the unprocessed data to the global computer network communicable device located remotely from the vehicle through the second data link, and transferring reset codes to the vehicle diagnostic system, wherein the global computer network communicable device is capable of communicating, over a global computer network, with a remotely located server containing a processor and a database of error code related information for processing the unprocessed diagnostic data into natural language diagnostic information and transferring the natural language information back to the global computer network communicable device for display thereon, and wherein the hand holdable data acquisition and transfer device lacks sufficient data processing capability to fully process the unprocessed diagnostic data into human-useable diagnostic information.

24. The vehicle monitoring and maintenance device of claim 23 wherein the personal computer comprises at least one of a desk top computer, notebook computer and a personal data assistant, and wherein the remote server is the sole component of the device that includes software having diagnostic information necessary to identify, from error codes in the unprocessed data, sources of conditions within the vehicle giving rise to the error codes, and suggested corrections for the conditions so identified.

* * * * *